United States Patent
Akiyama

(10) Patent No.: US 8,700,930 B2
(45) Date of Patent: Apr. 15, 2014

(54) INFORMATION PROCESSING APPARATUS, INFORMATION PROCESSING METHOD, AND PROGRAM FOR ABNORMAL TEMPERATURE DETECTION

(75) Inventor: Masaki Akiyama, Nagano (JP)

(73) Assignee: Sony Corporation, Tokyo (JP)

( * ) Notice: Subject to any disclaimer, the term of this patent is extended or adjusted under 35 U.S.C. 154(b) by 245 days.

(21) Appl. No.: 13/283,712

(22) Filed: Oct. 28, 2011

(65) Prior Publication Data

US 2012/0117395 A1    May 10, 2012

(30) Foreign Application Priority Data

Nov. 5, 2010  (JP) ................................ P2010-248429

(51) Int. Cl.
   G06F 1/00      (2006.01)
   G06F 1/32      (2006.01)
(52) U.S. Cl.
   CPC .................................... G06F 1/3203 (2013.01)
   USPC ......................................... 713/310; 713/324
(58) Field of Classification Search
   USPC ............................ 710/305–310; 713/300–340
   See application file for complete search history.

(56) References Cited

U.S. PATENT DOCUMENTS

| | | | |
|---|---|---|---|
| 5,664,201 A * | 9/1997 | Ikedea ........................... | 713/320 |
| 6,816,975 B1 * | 11/2004 | Sasaki et al. .................. | 713/300 |
| 7,596,706 B2 * | 9/2009 | Fuseya .......................... | 713/300 |
| 8,051,312 B2 * | 11/2011 | Foley ............................ | 713/321 |
| 2006/0288242 A1 * | 12/2006 | Song ............................. | 713/300 |
| 2011/0320834 A1 * | 12/2011 | Ingels et al. .................. | 713/310 |
| 2012/0060041 A1 * | 3/2012 | Hashimoto ................... | 713/310 |
| 2012/0254632 A1 * | 10/2012 | Saladin et al. ................ | 713/300 |

FOREIGN PATENT DOCUMENTS

| JP | 10-254780 A | 9/1998 |
|---|---|---|
| JP | 2003-333748 A | 11/2003 |
| JP | 2008-117000 A | 5/2008 |

* cited by examiner

Primary Examiner — Raymond Phan
(74) Attorney, Agent, or Firm — Sony Corporation

(57) ABSTRACT

An information processing apparatus includes a power switch which is turned ON and OFF for supplying and cutting off power; a power supply portion which supplies power to each portion through the power switch; an operation control portion to which power is supplied from the power supply portion regardless of the ON or OFF state of the power switch, which controls power supply to a main storage device including a built-in cache memory based on software; a measurement portion which measures temperature of a measurement target; and a power control portion which is controlled by the operation control portion and controls power supply to the main storage device from the power supply portion.

9 Claims, 5 Drawing Sheets

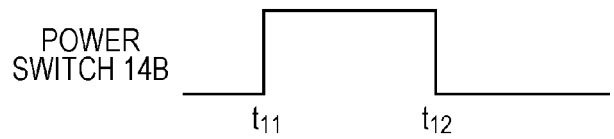
FIG. 5A   POWER SWITCH 14B
$t_{11}$   $t_{12}$
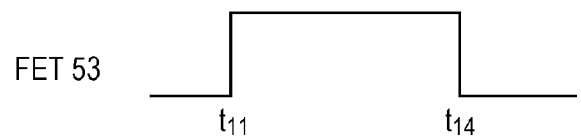
FIG. 5B   FET 53
$t_{11}$   $t_{14}$
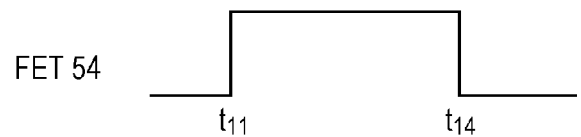
FIG. 5C   FET 54
$t_{11}$   $t_{14}$
FIG. 5D   MEASUREMENT PORTION 17
$t_{12}$ $t_{13}$
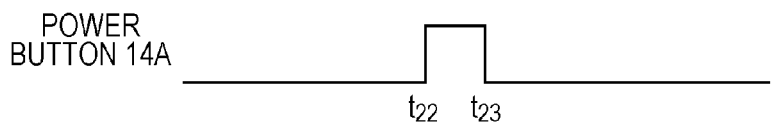
FIG. 6A   POWER BUTTON 14A
$t_{22}$ $t_{23}$
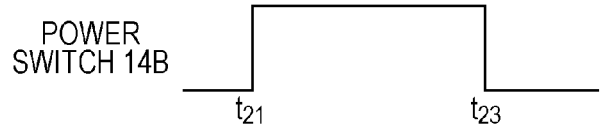
FIG. 6B   POWER SWITCH 14B
$t_{21}$   $t_{23}$
FIG. 6C   FET 53
$t_{21}$   $t_{24}$
FIG. 6D   FET 54
$t_{21}$   $t_{24}$

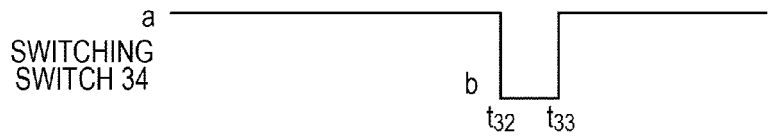
FIG. 7A  SWITCHING SWITCH 34
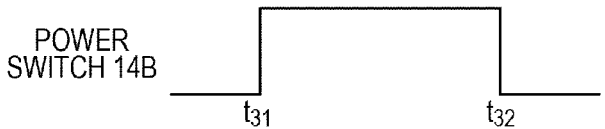
FIG. 7B  POWER SWITCH 14B
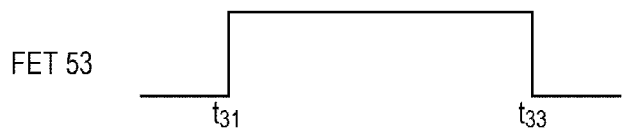
FIG. 7C  FET 53
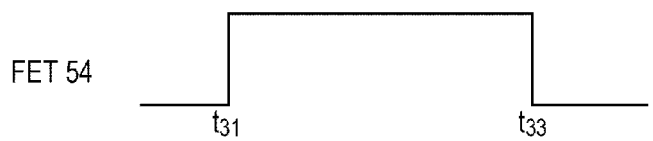
FIG. 7D  FET 54
FIG. 8
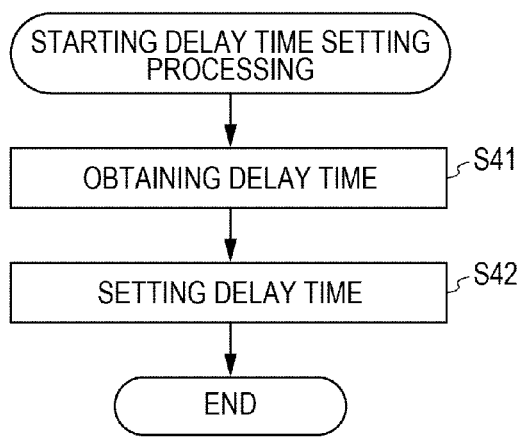

INFORMATION PROCESSING APPARATUS, INFORMATION PROCESSING METHOD, AND PROGRAM FOR ABNORMAL TEMPERATURE DETECTION

CROSS-REFERENCE TO RELATED APPLICATION

The present application claims priority from Japanese Patent Application No. JP 2010-248429 filed in the Japanese Patent Office on Nov. 5, 2010, the entire content of which is incorporated herein by reference.

BACKGROUND

The present disclosure relates to an information processing apparatus, an information processing method, and a program. Particularly, the present disclosure relates to an information processing apparatus, an information processing method, and a program which make it possible to prevent data loss and to protect the apparatus from abnormal temperature.

When the operations of a personal computer are terminated, power is turned OFF. However, if power is turned OFF while data is being recorded on a hard disk, only incomplete data is recorded on the hard disk, which becomes a cause of failure. For example, if power is turned OFF while data is saved in a cache memory that temporarily holds data to be recorded on the hard disk, the data in the cache memory is lost without being recorded on the hard disk.

Japanese Unexamined Patent Application Publication No. 2003-333748 proposes a technique as follows. That is, in the disclosure of the Japanese Unexamined Patent Application Publication No. 2003-333748, when a power switch is turned OFF, power supply to the hard disk drive is not directly cut off. In the disclosure, a delay circuit including a resistance and a condenser is provided, and a power OFF signal generated when the power switch is turned OFF is delayed for a certain time by the delay circuit. Then, after a certain time has elapsed, power supply to the hard disk drive is stopped. This technique provides sufficient time for recording the data in the cache memory on the hard disk, whereby the data loss is prevented.

SUMMARY

However, by merely delaying the cutoff of the power supply when the power switch is turned OFF as described above, it is difficult to protect an apparatus by urgently terminating the operation when the temperature of the apparatus abnormally increases, for example.

It is desirable to prevent data loss and protect the apparatus from abnormal temperature.

According to an embodiment of the present disclosure, there is provided an information processing apparatus including a power switch which is turned ON and OFF for supplying and cutting off power; a power supply portion which supplies power to each portion through the power switch; an operation control portion to which power is supplied from the power supply portion regardless of the ON or OFF state of the power switch, and which controls power supply to a main storage device including a built-in cache memory based on software; a measurement portion which measures temperature of a measurement target; and a power control portion which is controlled by the operation control portion and controls power supply to the main storage device from the power supply portion, wherein when the measurement portion detects abnormal temperature, the operation control portion controls the power control portion after a time necessary for recording all data which is temporarily held in the cache memory so as to be recorded in the main storage device to be recorded in the main storage device has elapsed, thereby stopping the power supply to the main storage device from the power supply portion.

When the measurement portion further detects abnormal temperature, the operation control portion may stop the power supply from the power switch by immediately turning OFF the power switch.

The power control portion may include a first FET which supplies power from the power supply portion to the main storage device and a second FET which is controlled by the operation control portion and switches the first FET.

The measurement target may be the operation control portion.

The operation control portion may stop the power supply from the power switch by immediately turning off the power switch when a power button has been continuously operated for a certain time or longer, and may stop the power supply to the main storage device from the power supply portion by controlling the power control portion after a time necessary for recording all data which is temporarily held in the cache memory so as to be recorded in the main storage device to be recorded in the main storage device has elapsed from a state where that the power button had been continuously operated for a certain time or longer was detected.

The information processing apparatus may further include a battery for a normal mode for supplying power in a normal mode; an emergency battery for supplying power in an emergency; and a switching switch which connects either the battery for a normal mode or the emergency battery to the power switch, wherein the operation control portion may switch the switching switch so that the battery for a normal mode is connected to the power switch in the normal mode, and that the emergency battery is connected to the power switch in the emergency mode.

When continuous power stops being supplied, the operation control portion may determine this state as an emergency.

According to an embodiment of the present disclosure, the operation control portion may stop the power supply from the power switch by immediately turning OFF the power switch when the measurement portion detects abnormal temperature, and may stop the power supply to the main storage device from the power supply portion by controlling the power control portion after a time necessary for recording all data which is temporarily held in the cache memory so as to be recorded in the main storage device to be recorded in the main storage device has elapsed.

An information processing method and a program according to an embodiment of the present disclosure correspond to the information processing apparatus according to an embodiment of the present disclosure described above.

As described above, according to the embodiments of the present disclosure, it is possible to prevent data loss and to protect the apparatus from abnormal temperature.

BRIEF DESCRIPTION OF THE DRAWINGS

FIGS. 5A to 5D are timing charts illustrating timings of operations;

FIGS. 6A to 6D are timing charts illustrating timings of operations;

FIGS. 7A to 7D are timing charts illustrating timings of operations; and FIG. 8 is a flowchart illustrating delay time setting processing.

DETAILED DESCRIPTION OF EMBODIMENTS

Hereinafter, embodiments of the present disclosure (referred to as embodiments hereinbelow) will be described in the following order.

[Configuration of Information Processing Apparatus]
[Configuration of Hard Disk Drive]
[Functional Configuration of Operation Control Portion]
[Operation of Information Processing Apparatus in Normal Mode]
[Operation of Information Processing Apparatus during Termination]
[Timings of Operations in Abnormal Temperature Detection]
[Timings of Operations during Power Button Operation]
[Timings of Operations Performed when Power Supply is Cut Off]
[Delay Time Setting Processing]

[Configuration of Information Processing Apparatus]

Figure 1:
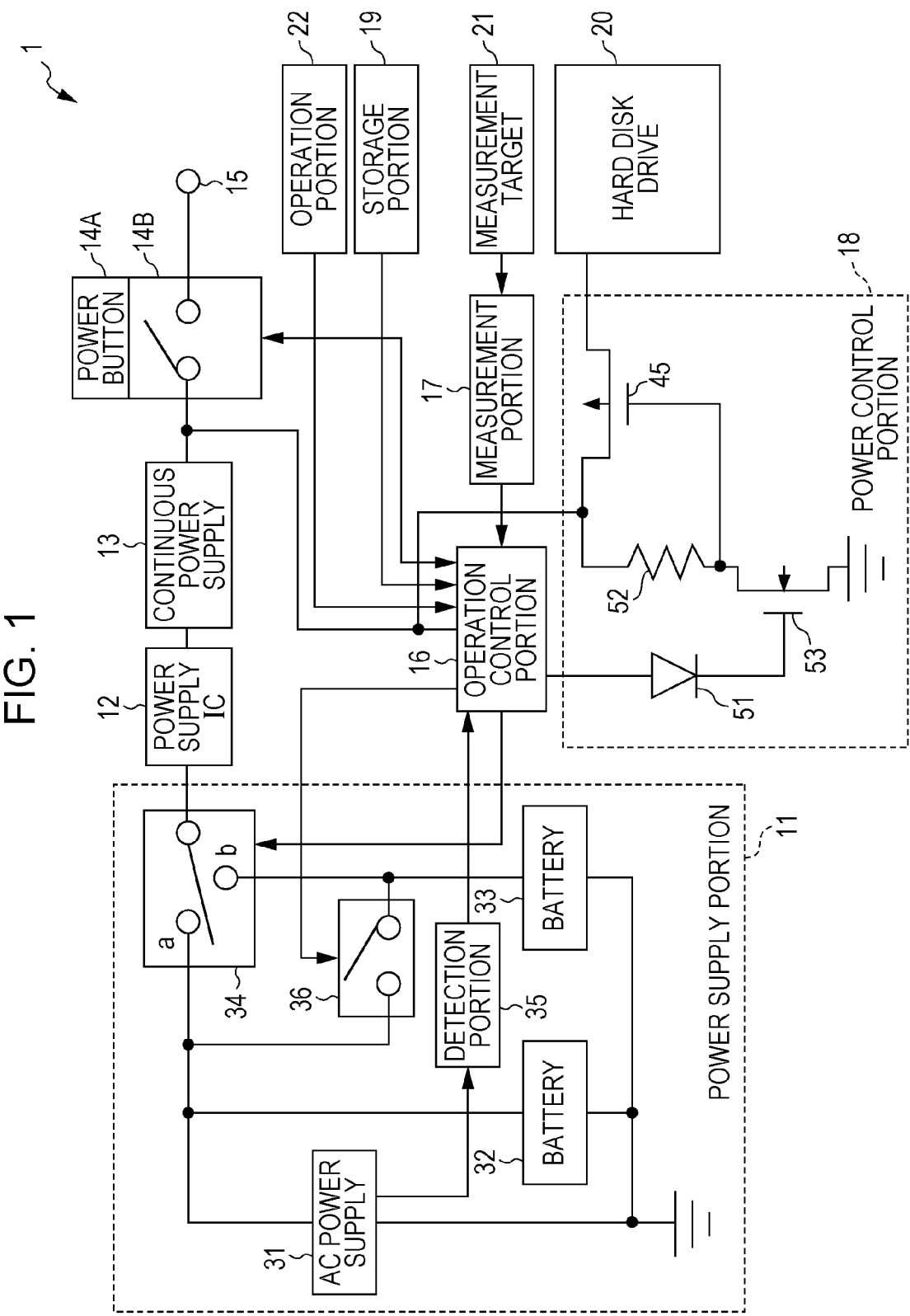
FIG. 1 is a circuit diagram showing a configuration of an embodiment of an information processing apparatus according to an embodiment of the present disclosure.

FIG. 1 is a circuit diagram showing a configuration of an embodiment of the information processing apparatus according to an embodiment of the present disclosure. An information processing apparatus 1 is configured with a personal computer, for example. The information processing apparatus 1 is configured with a power supply portion 11, a power supply IC 12, a continuous power supply 13, a power button 14A, a power switch 14B, a terminal 15, an operation control portion 16, a measurement portion 17, a power control portion 18, a storage portion 19, a hard disk drive 20, a measurement target 21, and an operation portion 22.

The power supply portion 11 includes an AC power supply 31, batteries 32 and 33, a switching switch 34, a detection portion 35, and a switching switch 36. The AC power supply 31 is connected to a condenser (not shown) or the like, and outputs direct currents by rectifying alternating currents. The battery 32 is charged by the AC power supply 31 when the AC power supply 31 is connected, and supplies power to each portion in place of the AC power supply 31 when the AC power supply 31 is not connected. For example, in a case of a portable personal computer, the battery 32 is used in a place where there is no electric outlet in some cases. In this case, the battery 32 has a capacity that can operate the information processing apparatus 1 for about several hours, similarly to a case where the battery 32 is connected to the AC power supply 31. A state of using the battery not connected to the AC power supply 31 is a normal usage state; therefore, the battery 32 is a battery for a normal mode.

The battery 33 is also charged by the AC power supply 31 when connected to the AC power supply 31, and supplies power to each portion in place of the AC power supply 31 when not connected to the AC power supply 31. For example, in a desktop type of personal computer that does not include the battery 32, the battery 33 supplies necessary minimum power in an emergency in which the AC power supply 31 is suddenly cut during operation, for example. Alternatively, when a laptop type of personal computer is used while not connected to the AC power supply 31, the battery 33 supplies necessary minimum power in an emergency in which the battery 32 is suddenly detached, for example. That is, the battery 33 is an emergency battery functioning in an emergency in which power is supplied neither from the AC power supply 31 nor from the battery 32. In the embodiment, the necessary minimum power in the emergency is power necessary for the hard disk drive 20 described later to store data held in a cache memory 71 in a hard disk 72. Consequently, capacity of the battery 33 is smaller than that of the battery 32.

The switching switch 34 is controlled by the operation control portion 16 described later so as to be switched to either a contact point a or a contact point b. In a normal mode, the switching switch 34 is switched to the contact point a side, and outputs the power of the battery 32 or the AC power supply 31 to each portion. In an emergency, the switching switch 34 is switched to the contact point b side, and outputs the power of the battery 33 to each portion.

The detection portion 35 detects whether the AC power supply 31 is connected to an electric outlet, that is, whether power is being supplied, and outputs the detected result to the operation control portion 16. The switching switch 36 is controlled by the operation control portion 16. While the AC power supply 31 is connected to the electric outlet, that is, while power is being supplied, the switching switch 36 is turned ON, and while the AC power supply 31 is not connected to the electric outlet, that is, while the power is not being supplied, the switching switch 36 is turned OFF.

The power supply IC 12 adjusts voltage supplied from the switching switch 34 to be constant. The continuous power supply 13 outputs the power supplied form the storage chamber 12 to the power switch 14B, the operation control portion 16, and the power control portion 18. When turned ON, the power switch 14B supplies the power supplied from the continuous power supply 13 to each portion (that is, each of constituent elements of the information processing apparatus 1) not shown, from the terminal 15. The power switch 14B is turned OFF when the power supply is stopped. The operation control portion 16 and the power control portion 18 are connected to an input terminal of the power switch 14B. Accordingly, power is continuously supplied regardless of the ON or OFF state of the power switch 14B. The power button 14A is operated by a user when the power switch 14B is forcedly turned OFF.

The operation control portion 16 is configured with a microcomputer, for example, and controls the operation of each portion according to a program stored in the storage portion 19 or the hard disk 72 (which will be described later with reference to FIG. 2) of the hard disk drive 20. Power is continuously supplied to the operation control portion 16 from the continuous power supply 13 regardless of the ON or OFF state of the power switch 14B. Accordingly, the operation control portion 16 can operate all the time. In the case of the embodiment, the operation control portion 16 has not only a function of controlling power supply to the hard disk drive 20 but also a function of controlling the operation of each portion of the information processing apparatus 1. However, the latter function can also be shared with another operation control portion (not shown).

The operation portion 22 is configured with a switch, a button, a mouse, and the like, and when being operated by the user, the operation portion 22 outputs control command signals corresponding to the operation to the operation control portion 16. The measurement portion 17 detects the temperature of the measurement target 21, and outputs the detected result to the operation control portion 16. The measurement target 21 is arbitrarily selected among the constituent elements of the information processing apparatus 1. The operation control portion 16 or another CPU (Central Processing Unit) may be selected as the measurement target 21. Among the constituent elements, when the operation control portion 16 generates the greatest amount of heat and reaches the greatest temperature, if the temperature of the operation control portion 16 is measured in advance, it is possible to protect other constituent elements from harmful effects caused by the state of high temperature.

The power control portion 18 is controlled by the operation control portion 16, and controls the power supply to the hard disk drive 20 from the continuous power supply 13. The power control portion 18 is configured with a diode 51, a resistance 52, an n-channel type FET (Field Effect Transistor) 53, and a p-channel type FET 54. The FETs 53 and 54 can be configured with an MOS (Metal Oxide Semiconductor) FET.

An anode of the diode 51 is connected to the operation control portion 16 and a cathode thereof is connected to a gate of the FET 53. A source which is a signal electrode at one side of the FET 53 is grounded, and a drain which is a signal electrode at the other side thereof is connected to one end of the resistance 52 and a gate of the FET 54. The source of the FET 54 is connected to a contact point of the continuous power supply 13 and the other end of the resistance 52, and the drain is connected to the hard disk drive 20.

[Configuration of Hard Disk Drive]

Figure 2:
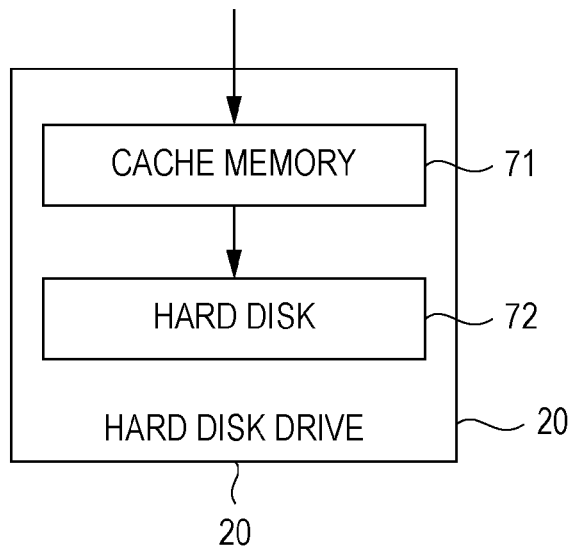
FIG. 2 is a block diagram showing a configuration of an embodiment of a hard disk drive.

FIG. 2 is a block diagram showing a configuration of an embodiment of the hard disk drive 20. The hard disk drive 20 which is a main storage device includes the built-in cache memory 71 and the hard disk 72. The cache memory 71 temporarily holds data which is provided based on an SATA (Serial Advanced Technology Attachment) standard and recorded in the hard disk 72. The cache memory 71 is configured with a RAM (Random Access Memory), for example. When power is turned OFF, the held data is lost. The data stored in the cache memory 71 is recorded in the hard disk 72.

[Functional Configuration of Operation Control Portion]

Figure 3:
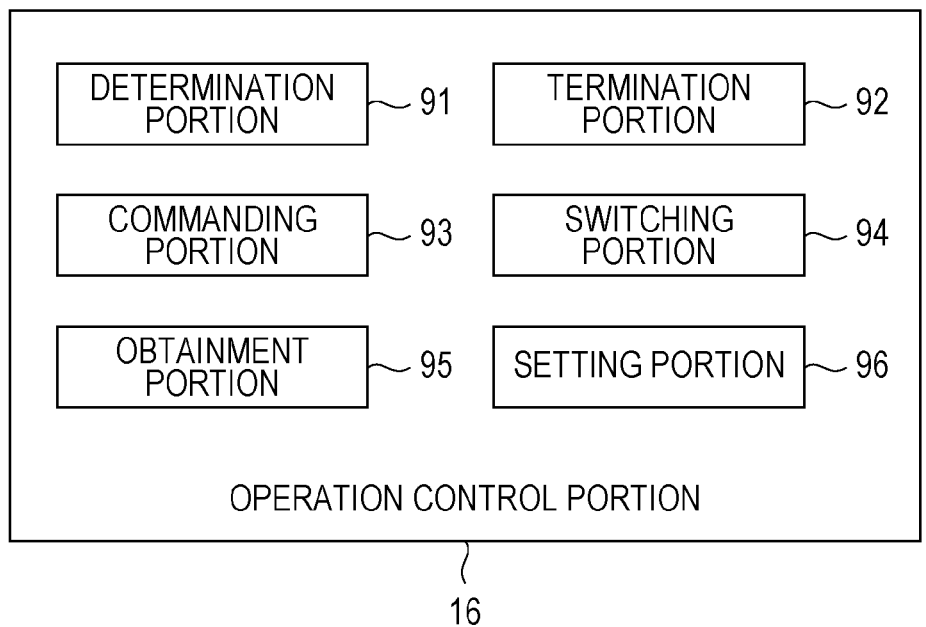
FIG. 3 is a block diagram showing a functional configuration of an operation control portion.

FIG. 3 is a block diagram showing a functional configuration of the operation control portion 16. The operation control portion 16 includes a determination portion 91, a termination portion 92, a commanding portion 93, a switching portion 94, an obtainment portion 95, and a setting portion 96. These portions are configured by each function of software and can optionally exchange data with one another.

The determination portion 91 performs various types of determination processing. The termination portion 92 executes software termination processing. The commanding portion 93 outputs commands to each portion. The switching portion 94 controls switching of switches and FETs. The obtainment portion 95 obtains a delay time designated by the user. The setting portion 96 sets the delay time.

[Operation of Information Processing Apparatus in Normal Mode]

Next, the operation of information processing apparatus 1 in a normal mode will be described. In the normal mode, the switching switch 34 is switched to the contact point a side by the operation control portion 16. Accordingly, the power from the AC power supply 31 is supplied to the operation control portion 16 through the contact point a of the switching switch 34, the power supply IC 12, and the continuous power supply 13. As a result, the operation control portion 16 is ready for operation all the time.

At this time, the power switch 14B is turned OFF. Accordingly, power is not supplied to each portion from the terminal 15. In addition, since the operation control portion 16 outputs logic L signals to the FET 53, the FET 53 is turned OFF. As a result, since a voltage of a logic H is supplied to the gate of the FET 54 from the continuous power supply 13 through the resistance 52, the FET 54 is turned OFF. Consequently, power is not supplied to the hard disk drive 20.

When the AC power supply 31 is connected to an electric outlet (not shown) and supplies power, this state is detected by the detection portion 35. At this time, the operation control portion 16 turns ON the switching switch 36. Accordingly, the batteries 32 and 33 have the load of the AC power supply 31, thereby being charged with the power from the AC power supply 31.

When the AC power supply 31 is not connected to the electric outlet, the operation control portion 16 turns OFF the switching switch 36. Accordingly, at this time, only the power from the battery 32 is consumed, and the power of the battery 33 is not consumed. As a result, wasteful consumption of the power of the battery 33 in a non-emergency, which causes the battery 33 to fail to function in an emergency, is prevented.

When start-up is instructed at a predetermined timing (for example, a time $t_{11}$ in FIGS. 5A to 5C, a time $t_{21}$ in FIGS. 6B to 6D, a time $t_{31}$ in FIGS. 7B to 7D, which will be described later), the operation control portion 16 turns ON the power switch 14B. As a result, power output from the continuous power supply 13 is supplied to each portion in addition to the measurement target 21 from the terminal 15. Moreover, at this time, the operation control portion 16 outputs a logic H signal to the gate of the FET 53 through the diode 51, and as a result, the FET 53 is turned ON. Consequently, since the gate of the FET 54 is grounded through the FET 53, the FET 54 is turned ON. Accordingly, the power from the continuous power supply 13 is supplied to the hard disk drive 20 through the FET 54, whereby the hard disk drive 20 is ready for operation.

In this state, when recording data in the hard disk 72 is instructed, the data is supplied to the cache memory 71 and then temporarily held. The held data is read out and recorded in the hard disk 72.

[Operation of Information Processing Apparatus During Termination]

Figure 4:
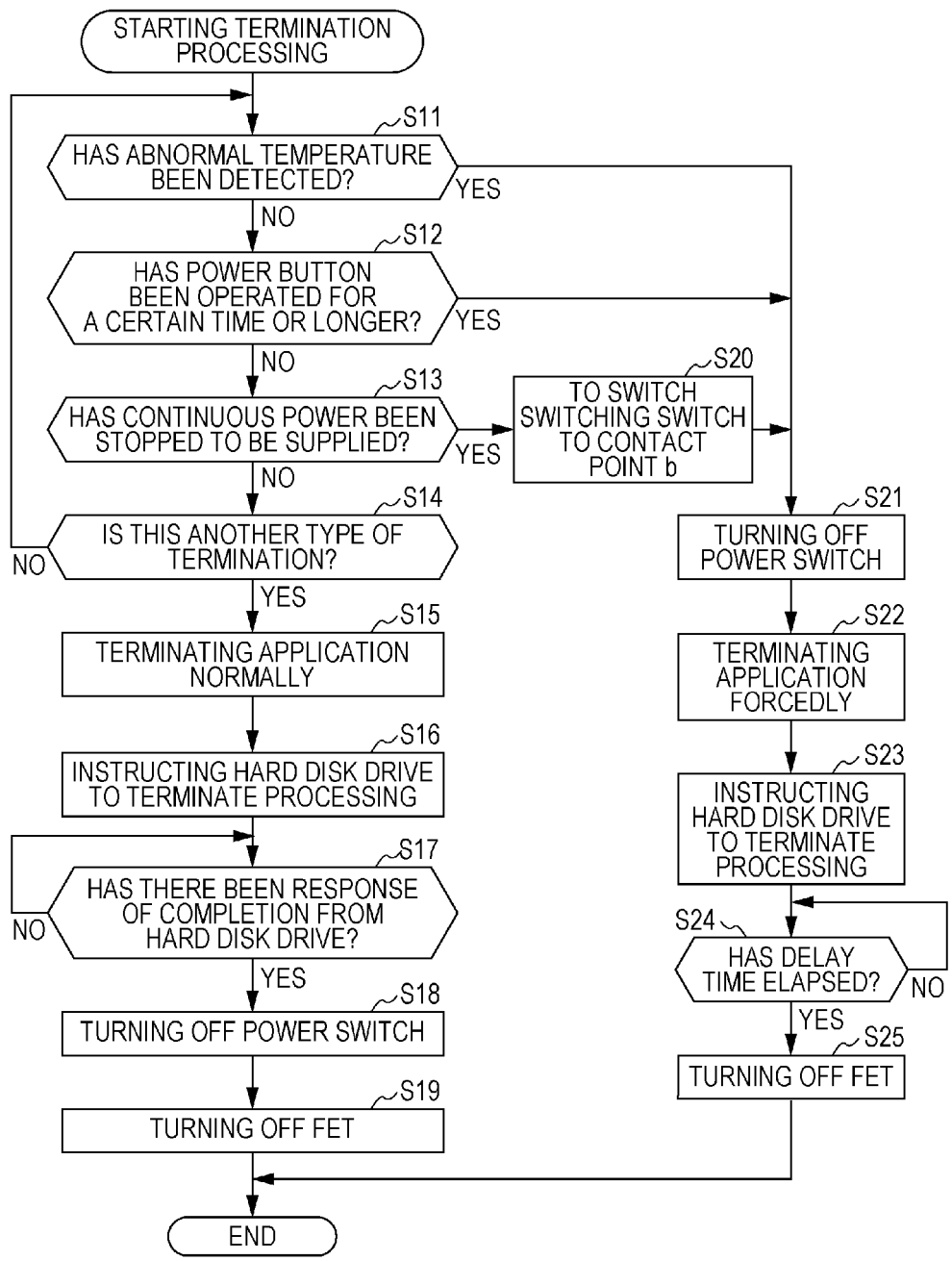
FIG. 4 is a flowchart illustrating termination processing.

Next, the operation at the time of termination will be described with reference to the flowchart in FIG. 4. FIG. 4 is a flowchart illustrating termination processing.

In step S11, the determination portion 91 of the operation control portion 16 determines whether abnormal temperature has been detected. That is, the measurement portion 17 constantly measures the temperature of the measurement target 21 and outputs the measured result. The determination portion 91 determines whether the temperature has become abnormal temperature which is higher than a preset standard temperature.

When the abnormal temperature has not been detected, in step S12, the determination portion 91 determines whether the power button 14A has been operated for a preset certain time or longer. That is, when the user wants to forcedly terminate the operation of the information processing apparatus 1 since an application has frozen or the like, the user continuously operates the power button 14A for 4 seconds or longer, for example.

When the power button 14A has not been operated for a certain time or longer, in step S13, the determination portion 91 determines whether the continuous power supply has been stopped. That is, if the AC power supply 31 and battery 32 are suddenly detached or removed, the voltage output from the continuous power supply 13 is drastically lowered. The determination portion 91 determines whether the output voltage of the continuous power supply 13 has become lower than a preset predetermined standard voltage.

When the power supply from the continuous power supply 13 has not been stopped, in step S14, the determination portion 91 determines whether the termination is another type of termination. This other type of termination refers to normal termination which is performed by the operation of a start button, a shut down button (neither of which are shown in the drawing), and the like, for example.

When all of steps S11 to S14 are determined to be NO, that is, when the termination has not been instructed, the process returns to step S11, and determination processing in steps S11 to S14 is repeated.

When it is determined that the other type of termination has been instructed in step S14, that is, the normal termination has been instructed, the termination portion 92 normally terminates an application that operates then, in step S15. Since this is normal termination, parameters or the like are saved, and it is possible to completely restore the state just before the termination, contrary to the case of forced termination in step S22 which will be described later. In step S16, the commanding portion 93 instructs the hard disk drive 20 to terminate processing. At this time, the hard disk drive 20 determines whether data is held in the cache memory 71. If the data is held in the cache memory 71, the hard disk drive 20 reads out the data, and records all of the data in the hard disk 72. Accordingly, the data loss is prevented.

When there is no unrecorded data in the cache memory 71, the hard disk drive 20 returns a response of completion of termination processing to the operation control portion 16. Subsequently, in step S17, the determination portion 91 determines whether there has been a response of completion from the hard disk drive 20. This processing is repeated until the response is given.

When it is determined that there has been a response of completion in step S17, the switching portion 94 turns OFF the power switch 14B in step S18. As a result, power supply to each portion from the terminal 15 is stopped. In addition, the switching portion 94 turns OFF the FET 54 in step S19. That is, the switching portion 94 switches the logic H signal that has been output to the gate of the FET 53 through the diode 51 with the logic L signal. Consequently, since the FET 53 is turned OFF, and the logic H signal is supplied to the gate from the continuous power supply 13 through the resistance 52, the FET 54 is turned OFF. As a result, power supply to the hard disk drive 20 is stopped.

On the other hand, when it is determined that the abnormal temperature has been detected in step S11, the switching portion 94 immediately turns OFF the power switch 14B in step S21. That is, as described later, although cut-off of the power supply to the hard disk drive 20 is delayed, the power supply to each portion from the terminal 15 is immediately stopped without delay. As a result, the constituent elements of the information processing apparatus 1 are prevented from being damaged by heat.

In step S22, the termination portion 92 forcedly terminates an application that operates then. Since this is forced termination, parameters or the like are not saved, and the state just before the termination fails to be completely restored later, contrary to the case of the normal termination in step S15. Since the application is forcedly terminated, the load of the operation control portion 16 is reduced. As a result, the power consumed by the operation control portion 16 is reduced, and the amount of heat generated is reduced accordingly, so temperature is reduced. Consequently, it is possible to prevent the damage caused by the heat of the operation control portion 16.

Next, in step S23, the commanding portion 93 instructs the hard disk drive 20 to terminate processing. Based on this instruction, the hard disk drive 20 records all of the data that is stored in the cache memory 71 then on the hard disk 72.

In step S24, the determination portion 91 determines whether the delay time has elapsed from when the abnormal temperature was detected. The preset delay time corresponds to a time necessary for recording all of the data that is stored in the cache memory 71 to full capacity on the hard disk 72.

For example, provided that the transmission rate of SATA is 150 MByte/sec, the capacity of the cache memory 71 is MByte, and that the data is fully stored in the cache memory 71, it takes 213.3 msec for all the data to be transmitted. Accordingly, 213.3 msec is set as the delay time. Alternatively, it is also possible to set the delay time to be 400 ms considering that recording time could be lengthened due to addition of a seek operation. The user can set the delay time, and the setting processing will be described later with reference to FIG. 8.

After the delay time has elapsed from when the abnormal temperature was detected, the switching portion 94 turns OFF the FET 54 in step S25. That is, the operation control portion 16 switches the logic H signal that has been output to the gate of the FET 53 through the diode 51 with the logic L signal. As a result, since the FET 53 is turned OFF, and the logic H signal is supplied to the gate from the continuous power supply 13 through the resistance 52, the FET 51 is turned OFF. Consequently, the power supply to the hard disk drive 20 is stopped.

In this manner, stopping of the power supply to the hard disk drive 20 is delayed for a time which corresponds to the time necessary for recording all of the data stored in the cache memory 71 to the maximum on the hard disk 72. As a result, even if the operation is terminated by the detection of the abnormal temperature, it is possible to prevent the data held in the cache memory 71 from being lost, for example.

After the hard disk drive 20 is instructed to terminate processing, when a certain time has elapsed without a wait for the response of the termination processing completion from the hard disk drive 20, the power supply to the hard disk drive 20 is immediately stopped. Therefore, compared to a case of waiting for the response, it is possible to protect the operation control portion 16 more rapidly.

In step S12, even when it is determined that the power button 14A has been operated for a certain time or longer, the same processing is executed as in the case where it is determined that the abnormal temperature has been detected in step S11. Accordingly, the same effect can be realized in this case as in the case where the abnormal temperature has been detected.

When it is determined that the continuous power supply is stopped in step S13, the switching portion 94 switches the switching switch 34 to the contact point b from the contact point a in step S20. As a result, the power from the battery 33 is supplied to the operation control portion 16 and the hard disk drive 20 through the switching switch 34, the power supply IC 12, and the continuous power supply 13. Thereafter, similarly to the case described above, the processing in steps S21 to S25 is executed.

In this manner, even when the AC power supply 31 is detached or the battery 32 is removed during operation, it is possible to prevent data loss.

[Timings of Operations in Abnormal Temperature Detection]

FIGS. 5A to 5D are timing charts showing timings of operations in the abnormal temperature detection. Hereinafter, the operations in the abnormal temperature detection will be further described with reference to FIGS. 5A to 5D.

The switching portion 94 instructed to start processing turns ON the power switch 14B at the time $t_{11}$ (FIG. 5A). As a result, power is supplied to each portion form the terminal 15.

Moreover, the switching portion 94 turns ON the FET through the diode 51 at the time $t_{11}$ (FIG. 5B). As a result, the FET 54 is turned ON (FIG. 5C). Consequently, the power from the continuous power supply 13 is supplied to the hard disk drive 20 through the FET 54.

For example, when detecting abnormal temperature at a time $t_{12}$, the measurement portion 17 outputs an abnormal temperature detection signal from the time $t_{12}$ to a time $t_{13}$ (FIG. 5D). When receiving the abnormal temperature detection signal, the switching portion 94 of the operation control portion 16 immediately turns OFF the power switch 14B. As a result, power supply from the terminal 15 is stopped from the time $t_{12}$ (FIG. 5A).

The switching portion 94 turns OFF the FET 53 through the diode 51, at a time $t_{14}$ when a predetermined time T (for example, 400 ms as described above) has elapsed from the time $t_{12}$ of the abnormal temperature detection (FIG. 5B). As a result, the FET 54 is turned OFF (FIG. 5C). At the time $t_{14}$, the processing of recording all the data in the cache memory 71 on the hard disk 72 is completed. Therefore, after the completion of the recording processing, the power supply to the hard disk drive 20 is stopped.

[Timings of Operations During Power Button Operation]

FIGS. 6A to 6D are timing charts showing timings of operations during operation of the power button 14A. Hereinafter, the operations during the operation of the power button 14A will be further described with reference to FIGS. 6A to 6D.

The switching portion 94 instructed to start processing turns ON the power switch 14B at a time $t_{21}$ (FIG. 6B). As a result, power is supplied to each portion from the terminal 15.

Moreover, the switching portion 94 turns ON the FET through the diode 51 at the time $t_{21}$ (FIG. 6C). As a result, the FET 54 is turned ON (FIG. 6D). Consequently, the power from the continuous power supply 13 is supplied to the hard disk drive 20 through the FET 54.

For example, when the power button 14A is operated for 4 seconds or longer from a time $t_{22}$ to a time $t_{23}$, the switching portion 94 of the operation control portion 16 immediately instructs the hard disk drive 20 to terminate processing and turns OFF the power switch 14B (FIG. 6B). As a result, the power supply from the terminal 15 is stopped from the time $t_{23}$.

The switching portion 94 turns OFF the FET 53 through the diode 51, at a time $t_{24}$ when a predetermined time T (for example, 400 ms as described above) has elapsed from the time $t_{23}$ of the termination instruction (FIG. 6C). As a result, the FET 54 is turned OFF (FIG. 6D). Consequently, after the processing of recording all of the data in the cache memory 71 on the hard disk 72 has been completed, the power supply to the hard disk drive 20 is stopped.

[Timings of Operations Performed when Power Supply is Cut Off]

FIGS. 7A to 7D are timing charts showing timings of operations performed when the power supply from the AC power supply 31 and the battery 32 is cut off during operation. Hereinafter, the operations performed when the power supply from the AC power supply 31 and the battery 32 is cut off during operation will be further described with reference to FIGS. 7A to 7D.

The switching portion 94 instructed to start processing turns ON the power switch 14B at a timing $t_{31}$ (FIG. 7B). As a result, power is supplied to each portion from the terminal 15.

Moreover, the switching portion 94 turns ON the FET through the diode 51 at the time $t_{31}$ (FIG. 7C). As a result, the FET 54 is turned ON (FIG. 7D). Consequently, the power from the continuous power supply 13 is supplied to the hard disk drive 20 through the FET 54.

For example, at a time $t_{32}$, when the power supply from the AC power supply 31 and the battery 32 is cut off, the switching portion 94 of the operation control portion 16 immediately instructs the hard disk drive 20 to terminate processing and turns OFF the power switch 14B (FIG. 7B). As a result, power supply from the terminal 15 is stopped from the time $t_{32}$.

At the time $t_{32}$, the switching portion 94 switches the switching switch 34 to the contact point b from the contact point a (FIG. 7A). As a result, power is supplied to the operation control portion 16 and the hard disk drive 20 from the battery 33 since then.

Moreover, the switching portion 94 turns OFF the FET 53 through the diode 51, at a time $t_{33}$ when a predetermined time T (for example, 400 ms as described above) has elapsed from the time $t_{32}$ when the power supply from the AC power supply 31 and the battery 32 was cut off (FIG. 7C). As a result, the FET 54 is turned OFF (FIG. 7D). Consequently, after the processing of recording all of the data in the cache memory 71 on the hard disk 72 is completed, the power supply to the hard disk drive 20 is stopped.

At the time $t_{33}$, the switching portion 94 switches the switching switch 34 back to the contact point a of the normal mode from the contact point b of the emergency.

[Delay Time Setting Processing]

In the embodiment, the user can arbitrarily set the delay time in step S24 of FIG. 4. The delay time setting processing will be described with reference to the flowchart in FIG. 8.

FIG. 8 is a flowchart illustrating the delay time setting processing. The processing is executed when the information processing apparatus 1 is used for the first time, or is executed in advance by the maker when the information processing apparatus 1 is produced.

The obtainment portion 95 obtains the delay time in step S41. That is, the user operates the operation portion 22, thereby inputting the delay time to be provided when the abnormal temperature is detected. The obtainment portion 95 obtains the value of the input delay time.

The setting portion 96 sets the delay time in step S42. That is, the delay time obtained in step S41 is stored in the storage portion 19. As described above, as the delay time determined in step S24 of FIG. 4, the delay time set in this manner is used.

As described above, in the embodiment, the delay time is set by software. Logically, it is also possible to configure the delay circuit with, for example, hardware including a resistance and a condenser. However, since the appropriate delay time varies depending on the type of the hard disk drive 20, if the delay circuit is configured with the hardware, it is necessary to prepare a different delay circuit for each hard disk drive 20, which increases costs. If the delay time is set by software, the time may be simply set by being caused to correspond to the hard disk drive 20, hence the degree of freedom in design improves. That is, it is easy to respond to the modification of design of the hard disk drive 20, which makes it possible to reduce costs. Moreover, since the delay time can be set to a more accurate value, an extra time for consideration can be shortened, and as a result, it is possible to shorten the delay time.

In the above description, the hard disk drive 20 is taken as the main storage device. However, the present disclosure can also be applied to other main storage devices having a configuration in which the data temporarily held in the built-in cache memory is stored in a storage medium. The storage medium to which the data is transmitted from the cache memory also includes arbitrary ones such as a magnetic disk, a magneto-optical disc, an optical disc, a semiconductor memory, and the like.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   a power switch which is turned ON and OFF for supplying and cutting off power;
   a power supply portion which supplies power to each portion through the power switch;
   an operation control portion to which power is supplied from the power supply portion regardless of the ON or OFF state of the power switch, and which controls power supply to a main storage device including a built-in cache memory based on software;
   a measurement portion which measures temperature of a measurement target;
   a power control portion which is controlled by the operation control portion and controls power supply to the main storage device from the power supply portion,
   wherein when the measurement portion detects abnormal temperature, the operation control portion controls the power control portion after a time necessary for recording all data, which is temporarily held in the cache memory so as to be recorded in the main storage device, has elapsed, thereby stopping the power supply to the main storage device from the power supply portion; and
   a switching switch which connects either a battery for a normal mode or an emergency battery to the power switch,
   wherein the operation control portion switches the switching switch so that the battery is connected to the power switch in the normal mode, and the emergency battery is connected to the power switch in an emergency mode.

2. The information processing apparatus according to claim 1,
   wherein when the measurement portion further detects abnormal temperature, the operation control portion stops the power supply from the power switch by immediately turning OFF the power switch.

3. The information processing apparatus according to claim 1,
   wherein the power control portion includes a first FET which supplies power from the power supply portion to the main storage device and a second FET which is controlled by the operation control portion and switches the first FET.

4. The information processing apparatus according to claim 1,
   wherein the measurement target is the operation control portion.

5. An information processing apparatus comprising:
   a power switch which is turned ON and OFF for supplying and cutting off power;
   a power supply portion which supplies power to each portion through the power switch;
   an operation control portion to which power is supplied from the power supply portion regardless of the ON or OFF state of the power switch, and which controls power supply to a main storage device including a built-in cache memory based on software;
   a measurement portion which measures temperature of a measurement target; and
   a power control portion which is controlled by the operation control portion and controls power supply to the main storage device from the power supply portion,
   wherein when the measurement portion detects abnormal temperature, the operation control portion controls the power control portion after a time necessary for recording all data, which is temporarily held in the cache memory so as to be recorded in the main storage device, has elapsed, thereby stopping the power supply to the main storage device from the power supply portion,
   wherein when the measurement portion further detects abnormal temperature, the operation control portion stops the power supply from the power switch by immediately turning OFF the power switch, wherein the power control portion includes a first FET which supplies power from the power supply portion to the main storage device and a second FET which is controlled by the operation control portion and switches the first FET, wherein the measurement target is the operation control portion,
   wherein the operation control portion stops the power supply from the power switch by immediately turning off the power switch when a power button has been continuously operated for a certain time or longer, and stops the power supply to the main storage device from the power supply portion by controlling the power control portion after the time necessary for recording all the data which is temporarily held in the cache memory so as to be recorded in the main storage device, to be recorded in the main storage device has elapsed from a state where that the power button had been continuously operated for a certain time or longer was detected.

6. The information processing apparatus according to claim 5, further comprising:
   a battery for a normal mode for supplying power in a normal mode;
   an emergency battery for supplying power in an emergency; and
   a switching switch which connects either the battery for a normal mode or the emergency battery to the power switch, wherein the operation control portion switches the switching switch so that the battery for a normal mode is connected to the power switch in the normal mode, and so that the emergency battery is connected to the power switch in an emergency mode.

7. The information processing apparatus according to claim 6,
   wherein when continuous power stops being supplied, the operation control portion determines this state as the emergency.

8. An information processing method comprising:
   turning ON and OFF a power switch of an information processing apparatus for supplying and cutting off power;
   supplying power to each portion through the power switch;
   supplying power to an operation control portion from the power supply portion regardless of the ON or OFF state of the power switch, wherein the operation control portion controls power supply to a main storage device including a built-in cache memory based on software;
   measuring temperature of a measurement target;
   controlling a power control portion by the operation control portion to control power supply to the main storage device from the power supply portion,
   wherein when abnormal temperature of the measurement target is detected, the operation control portion stops the power supply to the main storage device from the power supply portion by controlling the power control portion after a time necessary for recording all data in the main storage device has elapsed, wherein the data is temporarily held in the cache memory so as to be recorded in the main storage device, wherein the operation control portion stops the power supply from the power switch by immediately turning off the power switch when a power button has been continuously operated for a certain time or longer, and stops the power supply to the main storage device from the power supply portion by controlling the power control portion after the time necessary for recording all the data in the main storage device has elapsed from a state where that the power button had been continuously operated for a certain time or longer was detected.

9. A non-transitory computer readable medium having stored thereon, a program for causing a computer to control operations of an information processing apparatus, the program when executed by the computer causes the computer to:

supply power from a power supply portion to each portion through a power switch;

supply power to an operation control portion from the power supply portion regardless of ON or OFF state of the power switch, wherein the operation control portion controls power supply to a main storage device including a built-in cache memory based on software;

measure temperature of a measurement target; and control a power control portion by the operation control portion to control power supply to the main storage device from the power supply portion, wherein when abnormal temperature of the measurement target is detected, the operation control portion stops the power supply to the main storage device from the power supply portion by controlling the power control portion after a time necessary for recording all data in the main storage device has elapsed, wherein the data is temporarily held in the cache memory so as to be recorded in the main storage device, wherein the operation control portion switches a switching switch so that a battery for a normal mode is connected to the power switch in a normal mode and an emergency battery is connected to the power switch in an emergency mode.

* * * * *